Aug. 2, 1927.
J. DENARO
1,637,556
EDIBLE CONTAINER FOR ICE CREAM
Filed April 20, 1925
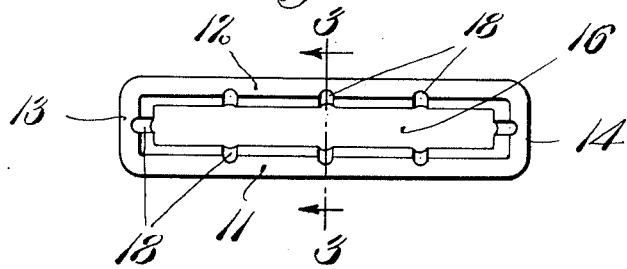
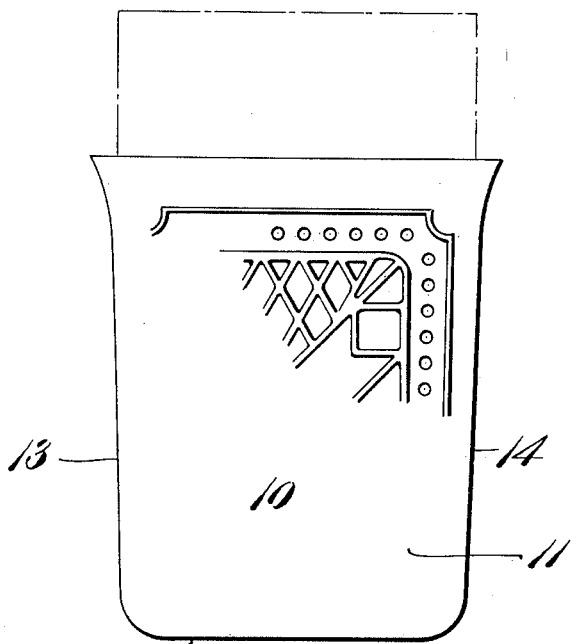
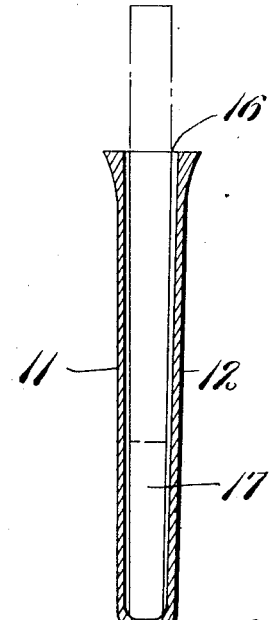
Inventor:
James Denaro
by Jesse A. Holton
Atty.

Patented Aug. 2, 1927.

1,637,556

UNITED STATES PATENT OFFICE.

JAMES DENARO, OF CAMBRIDGE, MASSACHUSETTS.

EDIBLE CONTAINER FOR ICE CREAM.

Application filed April 20, 1925. Serial No. 24,320.

This invention relates to edible containers for ice cream or other fillers and with regard to certain more specific features thereof to baked pastry products.

The invention has for one of its objects to provide a container which may be vended and used in lieu of the popular cone-shaped containers to thereby avoid many of the objectionable characteristics of the latter. Another object of the invention is to provide a container which may be used in lieu of the ice cream sandwiches largely vended at the present time, so that the container may satisfy the individual taste whether it has been previously for a cone or for a sandwich.

The idea is to provide a box-like edible shell with one open edge for the introduction of the filler, making it possible for the person eating the composite edible substance to bite completely through the opposed side walls of the container as is done in eating an ice cream sandwich.

In the accompanying drawing wherein is shown one of the various possible embodiments of the invention:—

Figure 1 is a view in front elevation of the improved container.

Figure 2 is a top plan view of the same, and

Figure 3 is a sectional view taken along the line 3—3 of Figure 2.

The body of the container is designated by the numeral 10 and preferably it is composed of batter having a flour base and baked within molds to a crisp condition. Obviously, the material used does not go to the essence of the invention.

Widthwise the container is much larger in dimension than in the direction of what might be called the over-all thickness. There are front and rear walls 11 and 12 respectively connected by side walls 13 and 14 and a base wall 15. The open top end is indicated at 16 in the shape of a slot.

Considering the container in connection with the use of bulk ice cream which is scooped into a mold and formed into a flat-sided unit, a cavity 17 formed by the aforesaid walls is adapted to receive the unit of cream through the upper open end of the container. To facilitate the introduction of the unit of cream and enable the vendor to force the cream well down to the bottom of the container, a plurality of grooves 18 are formed on the inner walls of the container extending from the top edge down to points at or near the bottom wall. These grooves prevent air pocketing in the bottom of the container so that the unit of cream may be easily introduced and forced to the bottom wall. They also afford a certain amount of flexibility so that the container will give slightly and not break when the dispenser is introduced to the mouth of the container. Were it not for these grooves, the container, being brittle, would be subject to breakage when the metal dispenser is crowded into the top opening. The front, rear and side walls are slightly tapered outwardly from the bottom wall toward the open edge so that the unit of cream may wedge tightly at or near the bottom and leave a slight amount of space around the unit near the top. This allows for some melting or decomposition of the filler without overflowing the top edge. It should also be noted that the front, rear and side walls of the container have their outer surfaces rather abruptly flared outwardly at the top edge of the container. This involves extra material at the top edge providing a reinforcement of the whole structure so that the containers are less likely to break down in packing or handling.

What I claim is:—

1. An edible container of baked pastry for ice cream or other filler, comprising a shallow box with one open end; the inner walls of said box being generally flat but with channels therein to permit the escape of air outwardly as the filler unit is introduced to the box.

2. An edible container for ice cream or other filler, which comprises a baked pastry box having one open end, the front, rear and side walls being integral with a base wall and tapering outwardly from said base wall, the upper open edge of the box being reinforced by additional material and a plurality of depressions from the inner surfaces of the contanier walls whereby the escape of air is permitted as the filler unit is introduced.

JAMES DENARO.